United States Patent
Seavey

(10) Patent No.: US 10,919,590 B2
(45) Date of Patent: Feb. 16, 2021

(54) ROBOTIC REPAIR SYSTEM FOR HIGH MAST LIGHT POLES

(71) Applicant: INFRASTRUCTURE PRESERVATION CORPORATION, Clearwater, FL (US)

(72) Inventor: William Seavey, Clearwater, FL (US)

(73) Assignee: INFRASTRUCTURE PRESERVATION CORPORATION, Clearwater, FL (US)

( * ) Notice: Subject to any disclaimer, the term of this patent is extended or adjusted under 35 U.S.C. 154(b) by 210 days.

(21) Appl. No.: 16/138,472

(22) Filed: Sep. 21, 2018

(65) Prior Publication Data

US 2019/0134824 A1    May 9, 2019

Related U.S. Application Data

(60) Provisional application No. 62/561,511, filed on Sep. 21, 2017.

(51) Int. Cl.
| | |
|---|---|
| *B62D 57/024* | (2006.01) |
| *B25J 11/00* | (2006.01) |
| *B25J 19/02* | (2006.01) |
| *B25J 13/00* | (2006.01) |
| *B25J 5/02* | (2006.01) |

(52) U.S. Cl.
CPC ............. *B62D 57/024* (2013.01); *B25J 5/02* (2013.01); *B25J 11/0065* (2013.01); *B25J 11/0075* (2013.01); *B25J 13/006* (2013.01); *B25J 19/023* (2013.01)

(58) Field of Classification Search
CPC .................................. B62D 57/024; B62J 5/02
See application file for complete search history.

(56) References Cited

U.S. PATENT DOCUMENTS

| | | | |
|---|---|---|---|
| 6,871,596 B2 * | 3/2005 | De-Gol | A63G 1/34 |
| | | | 104/53 |
| 7,496,454 B2 * | 2/2009 | Rogers | G01M 5/0025 |
| | | | 702/33 |
| 8,526,706 B2 | 9/2013 | Verreet | |
| 8,614,707 B2 | 12/2013 | Warsito et al. | |
| 8,660,698 B2 | 2/2014 | Phillips et al. | |

(Continued)

FOREIGN PATENT DOCUMENTS

| | | | |
|---|---|---|---|
| ES | 2230953 B2 * | 6/2006 | |
| JP | 2013-245496 A | 12/2013 | |

(Continued)

*Primary Examiner* — Kevin Hurley
(74) *Attorney, Agent, or Firm* — Matthew G. McKinney; Allen, Dyer et al.

(57) ABSTRACT

A robotic repair system for high mast light poles includes a support ring having a diameter to fit around a high mast light pole, a guide system secured to and above the support ring, and a platform engaging the guide system and coupled to an actuator configured to move the platform in a first direction, and an opposing second direction. The robotic repair system also includes a repair attachment secured to the platform to repair the high mast light pole, a drive wheel and a motor coupled to and configured to drive the drive wheel and configured to move the repair attachment along the guide system, and an outer guide track secured adjacent to the guide system where the drive wheel is within the outer guide track.

20 Claims, 7 Drawing Sheets

(56) References Cited

U.S. PATENT DOCUMENTS

| | | | |
|---|---|---|---|
| 9,075,023 B2 | 7/2015 | Yoshioka et al. | |
| 9,327,784 B2 * | 5/2016 | Bagheri | E04G 3/243 |
| 9,371,960 B2 | 6/2016 | Lorimer et al. | |
| 9,665,932 B2 | 5/2017 | Lauffer et al. | |
| 10,057,475 B2 * | 8/2018 | Marashdeh | H04N 5/23203 |
| 10,674,667 B2 * | 6/2020 | Megalingam | B25J 13/06 |
| 2013/0085365 A1 | 4/2013 | Marashdeh et al. | |
| 2013/0127452 A1 * | 5/2013 | Boenisch | G01N 27/9033 |
| | | | 324/242 |
| 2016/0161436 A1 | 6/2016 | Marashdeh et al. | |
| 2017/0180612 A1 | 6/2017 | Marashdeh et al. | |
| 2018/0324388 A1 * | 11/2018 | Seavey | H04N 5/232 |
| 2019/0366426 A1 * | 12/2019 | Wang | B25J 11/0085 |

FOREIGN PATENT DOCUMENTS

| | | |
|---|---|---|
| KR | 10-2010-0047926 A | 5/2010 |
| KR | 10-2013-0032076 A | 4/2013 |
| KR | 10-01480118 B1 | 1/2015 |

* cited by examiner

ROBOTIC REPAIR SYSTEM FOR HIGH MAST LIGHT POLES

RELATED APPLICATION

The present invention is related to U.S. Provisional Patent Application Ser. No. 62/561,511 filed Sep. 21, 2017, the entire contents of which are incorporated herein by reference.

TECHNICAL FIELD

The present invention relates to the field of structural repairs, and, more particularly, to a robotic repair system for high mast light poles and related methods.

BACKGROUND

High mast light poles are typically 100 to 120 feet tall, which makes it difficult to perform repairs of the upper portions of the poles. Existing methods of repairing/painting areas of high mast light poles involve bucket trucks, which typically can reach only ¾ height of the poles. In addition, using a bucket truck is expensive and may require partial lane closures that impacts traffic flow, and can be dangerous to the inspector. Accordingly, what is needed is a paint and rust repair system that can perform repairs of the high mast light poles safely and with increased coverage from the bottom to the top.

SUMMARY

A robotic repair system for high mast light poles is disclosed. The robotic repair system includes a support ring having a diameter to fit around a high mast light pole, a guide system secured to and above the support ring, and a platform engaging the guide system and coupled to an actuator configured to move the platform in a first direction, and an opposing second direction. The robotic repair system also includes a repair attachment secured to the platform to repair the high mast light pole, a drive wheel and a motor coupled to and configured to drive the drive wheel and configured to move the repair attachment along the guide system, and an outer guide track wherein the drive wheel is within the outer guide track. The repair attachment may include one of a paint roller and a grinder.

In addition, the robotic repair system may include a plurality of drive assemblies suspended from the support ring, where each of the plurality of drive assemblies may include a spring mechanism configured to force the plurality of wheels inward of the support ring.

DETAILED DESCRIPTION

Figure 1:
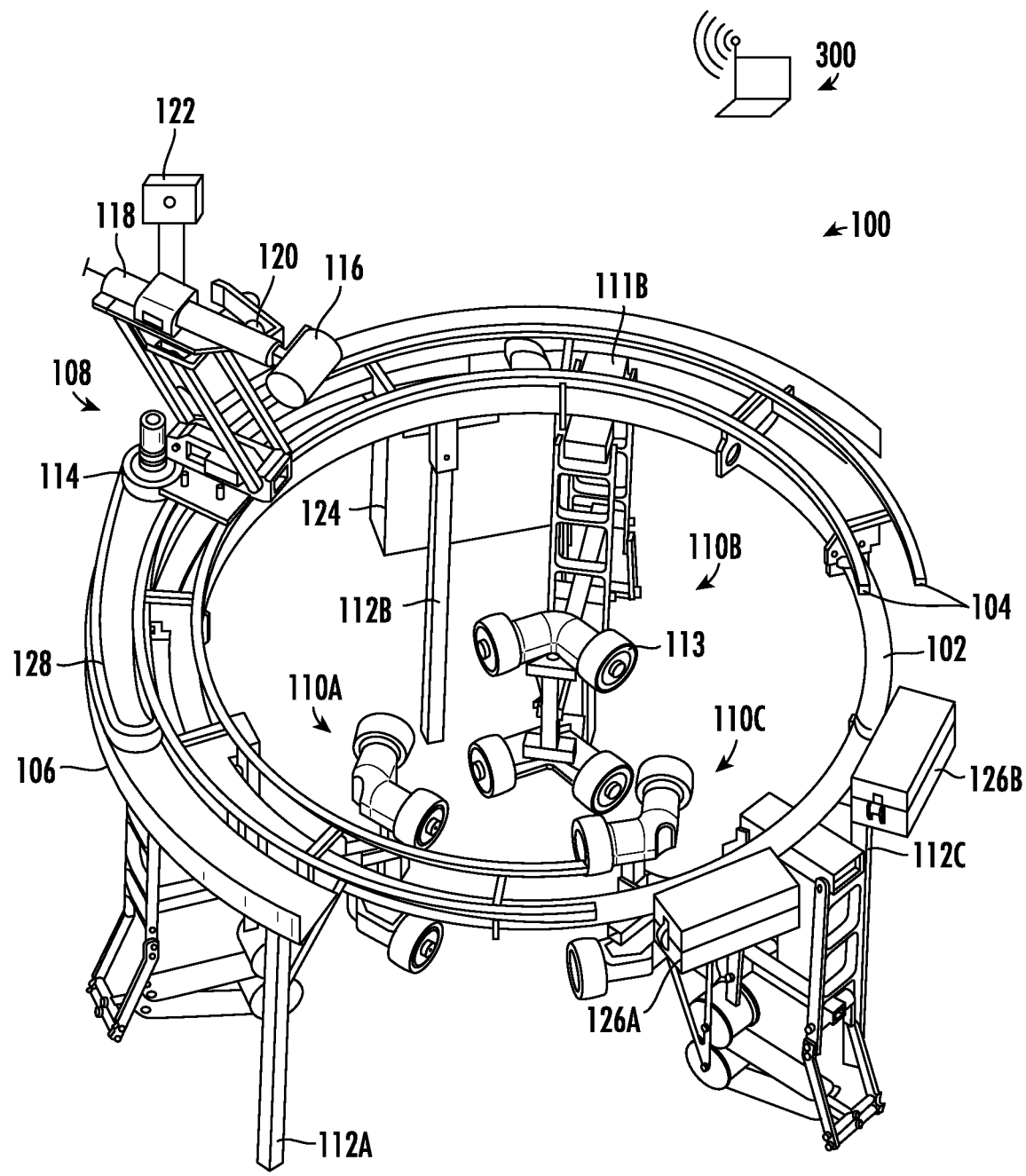
FIG. 1 is a perspective view of a robotic repair system for high mast light poles in accordance with the invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring now to FIGS. 1-4A, a robotic repair system 100 is shown. The robotic repair system 100 is a comprehensive maneuverable repair device that can travel up and down a high mast light pole. In addition, real time monitoring of the repair process of the light pole can be done as the robotic repair system 100 traverses the light pole. Advantages of the robotic repair system 100 include that it implements high definition video during the repair process of the high mast light pole and provides 100% repair coverage of the entire high mast light pole.

For example, the robotic repair system 100 may include at least one video camera 122 (e.g., 1080i and 60 fps). The robotic repair system 100 may include wireless communications equipment 126A, 126B to receive command and control signals and to wirelessly transmit video.

The robotic repair system 100 may include one or more video cameras 122 for the monitoring of the repair process, but typically four video cameras may be used to obtain a full 360-degree view of the light pole. For example, the robotic repair system 100 may have the video camera 122 mounted to a repair attachment or device 108. The output of the video camera 122 may be High Definition Multimedia Interface (HDMI) to provide high quality moving images (video) and a high-quality video recording (e.g., 1080i and 60 fps). In addition, each of the video cameras 122 may be mounted on an angle adjustment mechanism that allows the respective video camera 122 to pivot up and down. Thus, the video cameras 122 can provide a view that can assist in navigation and view the light pole. The control of the angle of the respective video camera 122 may be accomplished by the remote controls.

The robotic repair system 100 is configured to mount to a high mast light pole and travel the length and circumference of the high mast light pole while being fully controlled and monitored remotely. The drive assembly 110A, 110B, 110C for the robotic repair system 100 may include rubber wheels 113 adapted for gripping the high mast light pole and for mobility. The robotic repair system 100 is adapted to circumnavigate the high mast light pole using the video cameras 122 and is able to transverse the high mast light pole up and down from the base to the top of the high mast light pole by the rotation of the wheels 113.

The robotic repair system 100 is configured to gradually accelerate and decelerate in order to not spin the wheels 113. The robotic repair system 100 may include a support ring 102 that is configured to be secured around the high mast light pole, where the support ring 102 may be configured to swing open and close about a hinge pin in order to secure the robotic repair system 100 around the light pole.

In a particular aspect, the robotic repair system 100 includes three drive assemblies 110A, 110B, 110C secured to the support ring 102, and each drive assembly 110A, 110B, 110C is configured to drive the robotic repair system 100 along the light pole. Each of the drive assemblies 110A, 110B, 110C include two spring mechanisms 226A, 226B (e.g., constant force springs) that result in the wheels 113 being biased inward towards the center of the support ring 102 and the high mast light pole.

The spring mechanisms 226A, 226B force the wheels 113 of each drive assembly 110A, 110B, 110C to make secure contact to the light pole. The spring mechanisms 226A, 226B have sufficient tension so that as the robotic repair system 100 travels up the high mast light pole and the diameter of the high mast light pole decreases, the wheels 113 maintain sufficient friction contact to prevent the robotic repair system 100 from slipping back down the high mast light pole.

There may also be leg supports 112A, 112B, 112C that extend down from the support ring 102. The leg supports 112A, 112B, 112C are used to support the robotic repair system 100 off the ground as it is being secured to, or removed from, the high mast light pole.

As explained above, at least one video camera 122 may be coupled to the robotic repair system 100 and configured to capture high quality images (e.g. 24 MP). In a particular aspect, there are four video cameras 122 to provide overlapping coverage during the repairs. The robotic repair system 100 may include a power supply 124 in electrical communication with the video camera 122 and each drive assembly 110A, 110B, 110C.

A command center 300 may be in communication with the video camera 122, the repair device 108, and each drive assembly 110A, 110B, 110C of the robotic repair system 100. In a particular aspect, the controls are wireless controls that transmit signals to the robotic repair system 100. For example, wireless signals may be transmitted to each drive assembly 110A, 110B, 110C to drive the respective wheels 113 forward or in reverse. In addition, electric motors 216, 220 coupled to each respective drive assembly 110A, 110B, 110C may be configured to generate a signal correlating to a distance along the high mast light pole that the robotic repair system 100 moves. This signal can be transmitted back to the command center 300.

The command center 300 may include a base housing several video monitors that are used for displaying images from the video camera(s) 122 mounted to the robotic repair system 100. The wireless video capability allows the robotic repair system 100 to transmit a wireless multiplexed output of a plurality of video cameras 122 through the wireless communications equipment 126A, 126B having a wireless RF digital video transmitter. The multiplexing of the plurality of video cameras 122 allows all the video cameras 122 to be transmitted in one signal. The multiplexer may be part of one or more of the video cameras 122.

In operation, the robotic repair system 100 is latched around the high mast light pole. The spring mechanisms 126A, 126B are adjusted for each drive assembly 110A, 110B, 110C to confirm the attachment to the high mast light pole is sufficient. The robotic repair system 100 is then powered up. The robotic repair system 100 is configured to perform a short diagnostic to insure that the communications are working and that the mechanical robotics are functional and remote controllable.

The next step is to confirm the at least one video camera 122 is focused on the high mast light pole and is online. The next step is to confirm that the video received at the command center 300 is of high quality from the video camera 122. In the event multiple video cameras 122 are being used, each video camera 122 should be consistent from one to the other. If a video camera 122 is out of compliance, that video camera 122 is replaced with a replacement video camera of the same model. Once the video camera 122 is operational, a record unit of the command center 300 is activated and the robotic repair system 100 is checked for maneuverability up and down the high mast light pole. Once all functionalities are confirmed, then the recording is checked for performance and quality. In addition, the power system 124 is checked for appropriate amps and voltage.

The robotic repair system 100 is then deployed up the high mast light pole towards the top end of the high mast light pole. When the robotic repair system 100 reaches the damaged area the repairs can be made. Movement of the robotic repair system 100 is paused while the repair is made and recorded video is reviewed for any points of interest or to determine if the video is missing an area of the high mast light pole. The robotic repair system 100 is then monitored and any additional areas recorded as the robotic repair system 100 travels downward back to the base of the high mast light pole.

If a point of concern or a fault is found on the high mast light pole, the location is recorded and can be repaired. Once the robotic repair system 100 has finished the repairs and is back to the point that it was mounted, the robotic repair system 100 can be removed and prepared to be mounted to the next high mast light pole.

The repair device 108 includes a drive wheel 114 and an attachment such as a paint roller 116 for making repairs to the high mast light pole. In a particular aspect, the paint roller 116 may include a reservoir 118 for holding a coating such as paint. Actuator 120 may be in communication with the reservoir 118 and configured to pump the coating from the reservoir 118 to the paint roller 116 each time the actuator 120 is activated.

The repair device 108 includes guide wheels 144 that are configured to roll along a guide system such as a pair of rails 104, for example, while the repair device 108 is driven by the drive wheel 114 using motor 130. This allows the repair device 108 to smoothly rotate around the high mast light pole while the robotic repair system 100 is otherwise stationary on the high mast light pole. As explained above, the drive assemblies 110A, 110B, 110C are used to maneuver the robotic repair system 100 up and down the high mast light pole.

Figure 2:
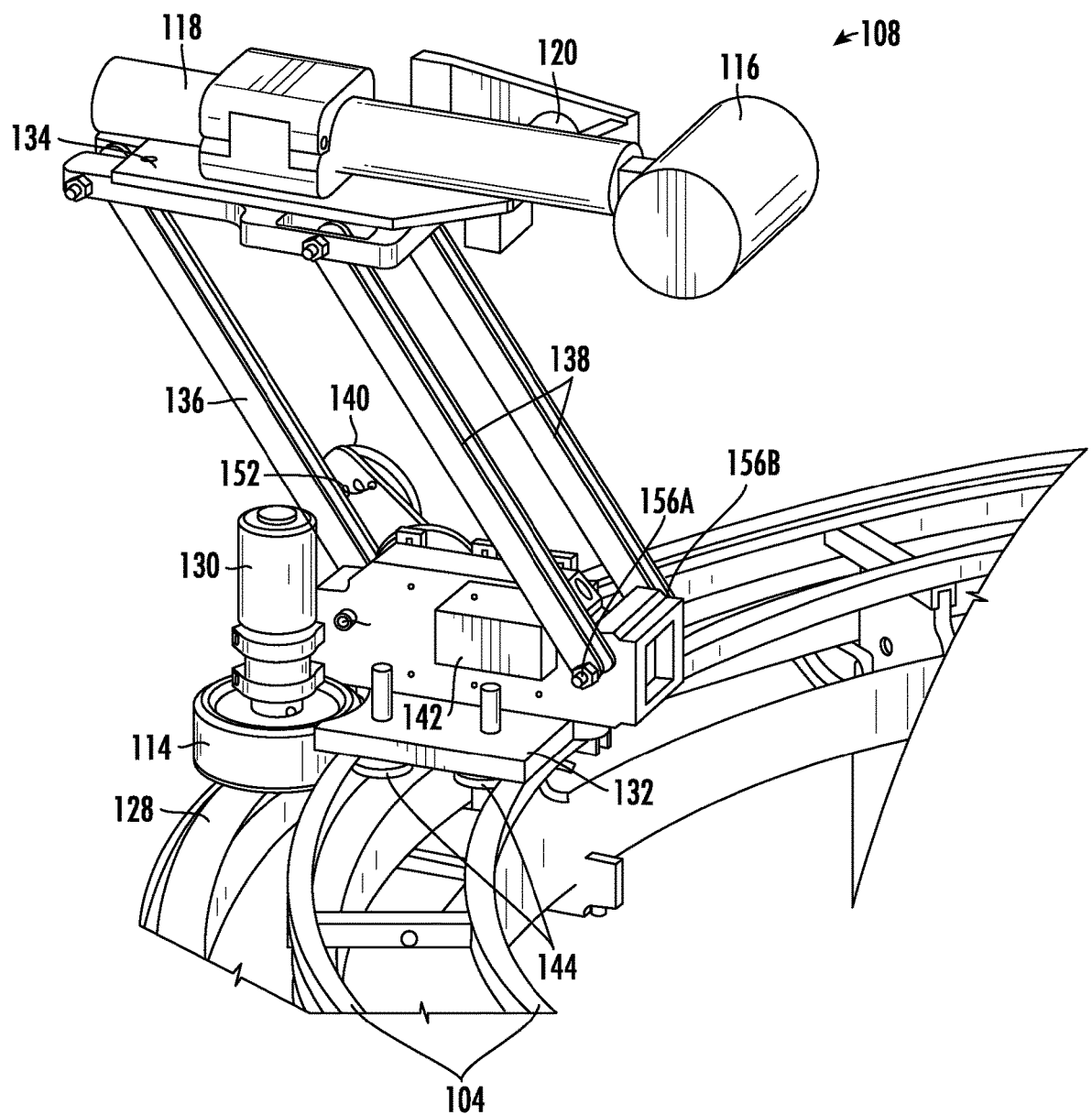
FIG. 2 is a detailed view of a repair device of the robotic repair system shown in FIG. 1.
Figure 3:
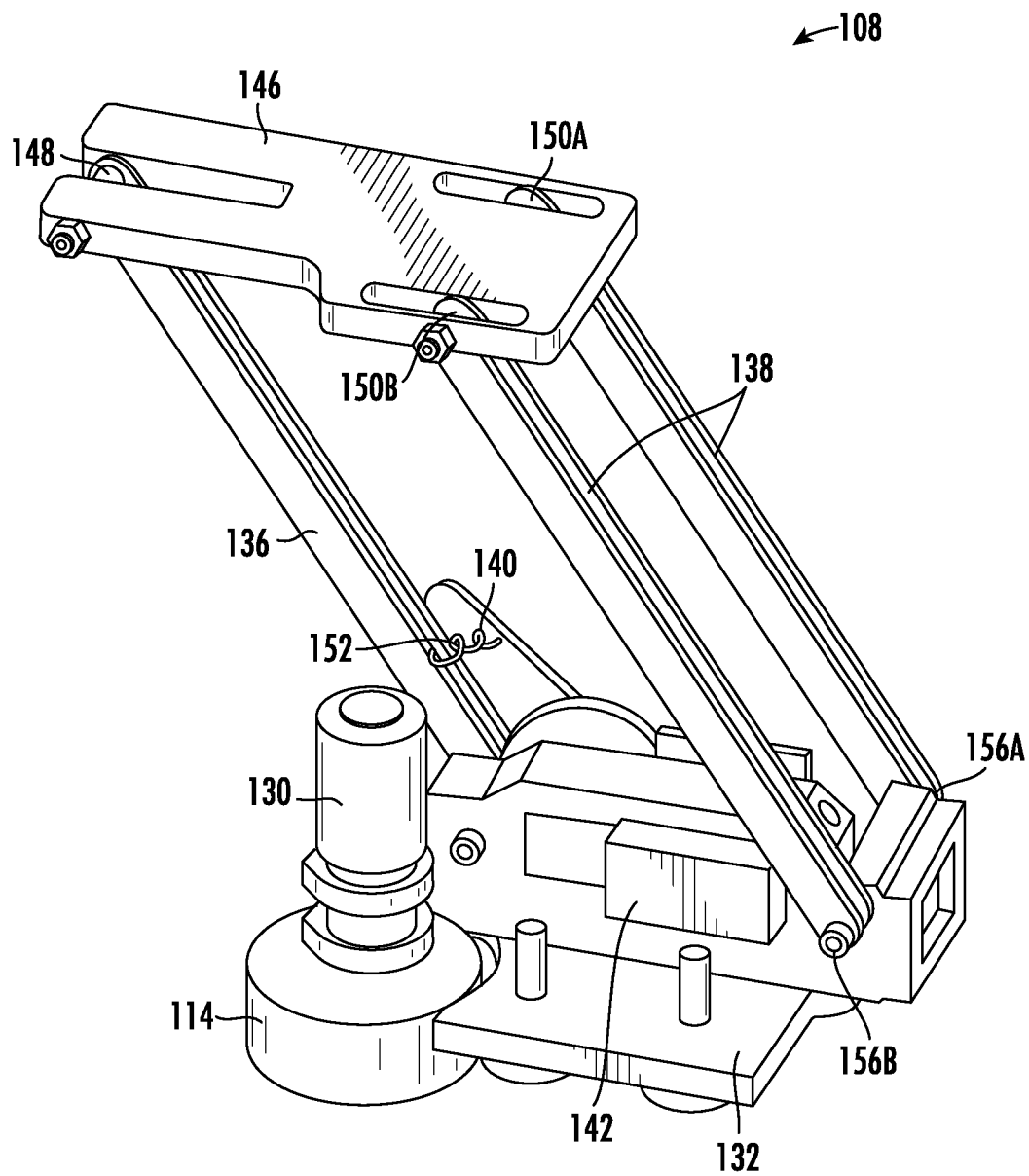
FIG. 3 is a view of the repair device without an attachment.

The repair device 108 is shown in more detail in FIGS. 2 and 3. In a particular aspect, the repair device 108 includes a rear strut 136 and a pair of front struts 138 that are mounted between a top platform 134 and a bottom platform 132. The top platform 134 is supported by top bracket 146. The rear strut 136 includes a rear lower pivot 154 and the pair of front struts 138 each have a front lower pivot point 156A, 156B that allows the top platform 310 to be moved using an actuator 142. An arm 140 is coupled to the actuator 142, where a spring 152 has a first end coupled to the arm 140 and a second end coupled to the rear strut 136.

Figure 4:
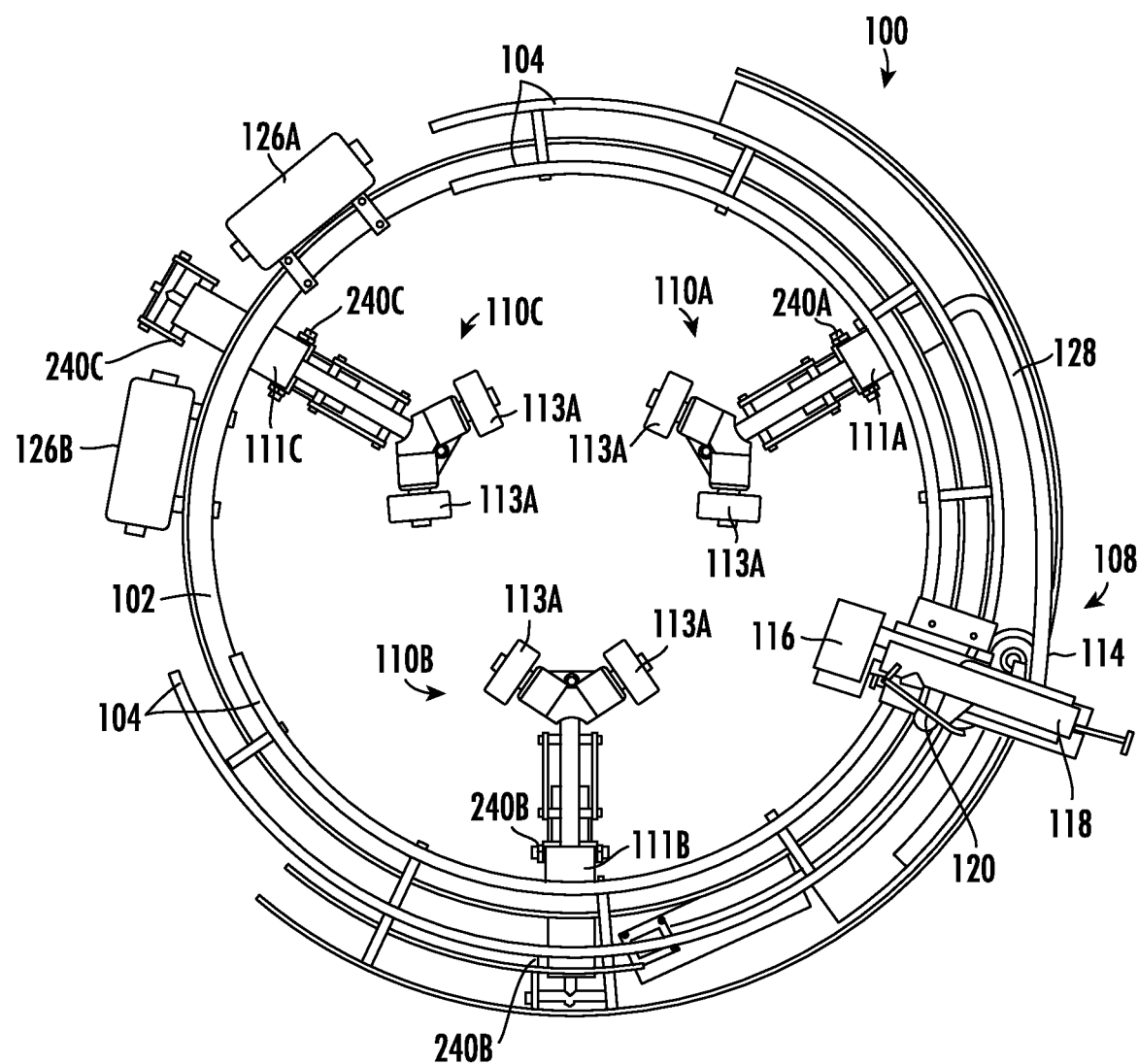
FIG. 4 is a top view of the robotic repair system shown in FIG. 1.
Figure 4A:
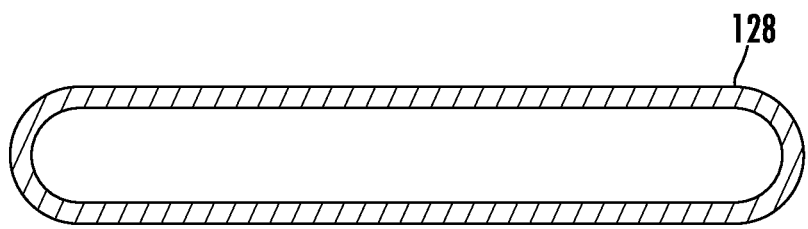
FIG. 4A is a top view of a flexible continuous track of the robotic repair system shown in FIG. 4.

In a particular aspect, the robotic repair device 100 includes an outer guide track 106 that is adjacent to an outer edge of the pair of rails 104 as best shown in FIG. 4. A flexible continuous track 128 (i.e. a loop as shown in FIG. 4A) fits inside the guide track 106 and the drive wheel 114 sits inside the flexible continuous track 128. As the drive wheel 114 rotates via motor 130, the drive wheel 114 rides inside the flexible continuous track 128 without slipping.

Once the drive wheel 114 reaches an end of the flexible continuous track 128, the drive wheel 114 continues to rotate which causes the flexible continuous track 128 to move along the guide track 106. If the drive wheel 114 reverses direction, then the flexible continuous track 128 remains stationary within the outer guide track 106 and the drive wheel 114 travels back along the flexible continuous track 128 moving the roller 116 (or other attachment) to the desired location on the high mast light pole.

As the actuator 142 is activated, the actuator rotates the arm 140 forward which causes the rear strut 136 to be pulled forward via the spring 152. As a result, the top platform 134 moves forward via the rear strut 136 along with the pair of front struts 138. This action in turn moves the repair device 108 having the paint roller 116, grinder, etc. forward to contact the high mast light pole to make the repair. A rear upper pivot 148 of the top bracket 146 works in concert with the rear lower pivot 154, and front upper pivots 150A, 150B of the top bracket 146 work in concert with the front lower pivots 156A, 156B, to move the paint roller 116 (or other attachment) forward and rearward. In particular, forward refers to moving in a direction towards a center of the support ring 102 and the high mast light pole, and rearward refers to moving in a direction away from the center of the support ring 102 and the high mast light pole.

Figure 5:
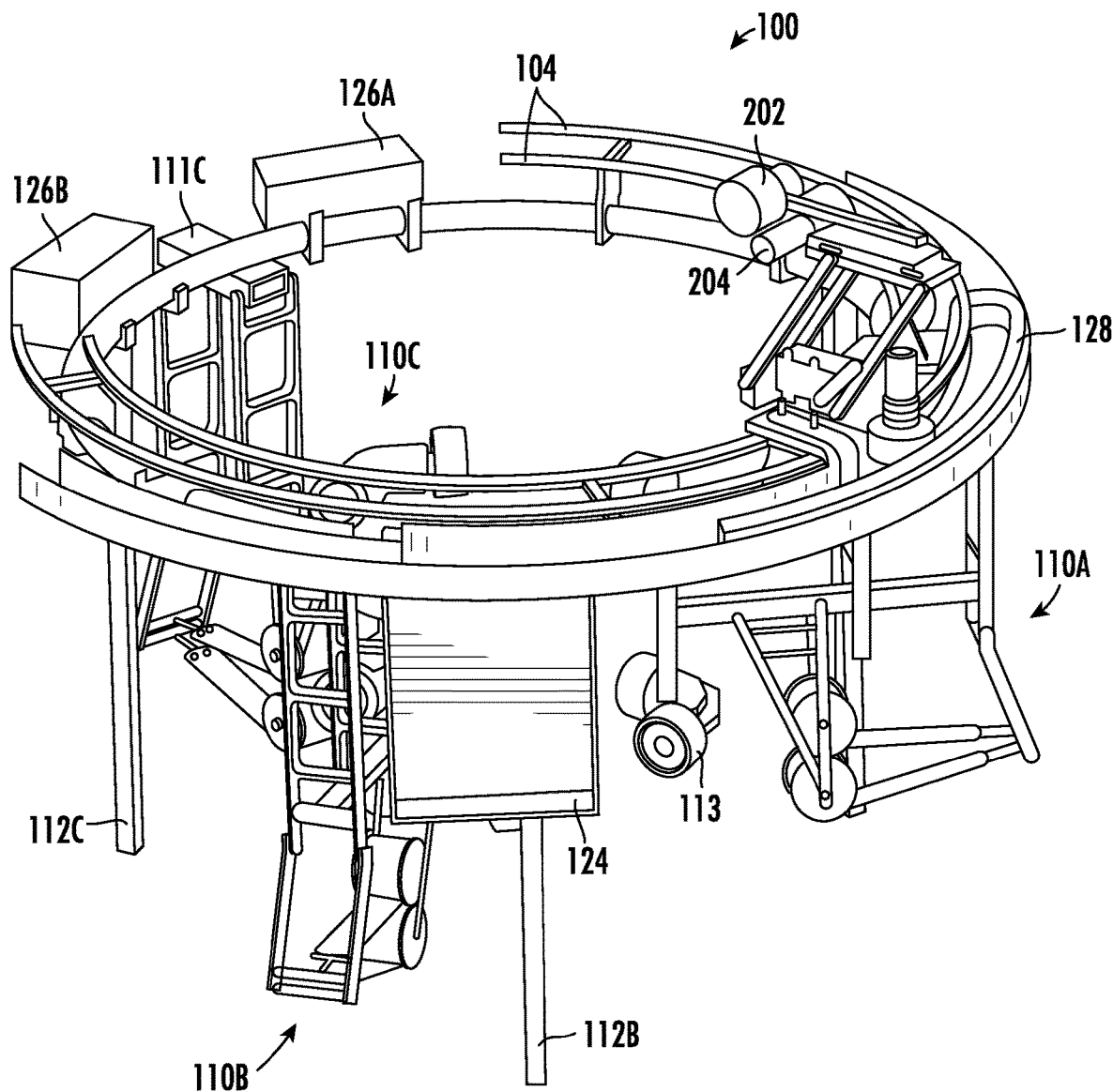
FIG. 5 is a perspective view of the robotic repair system shown in FIG. 1 with the attachment in a first position.
Figure 6:
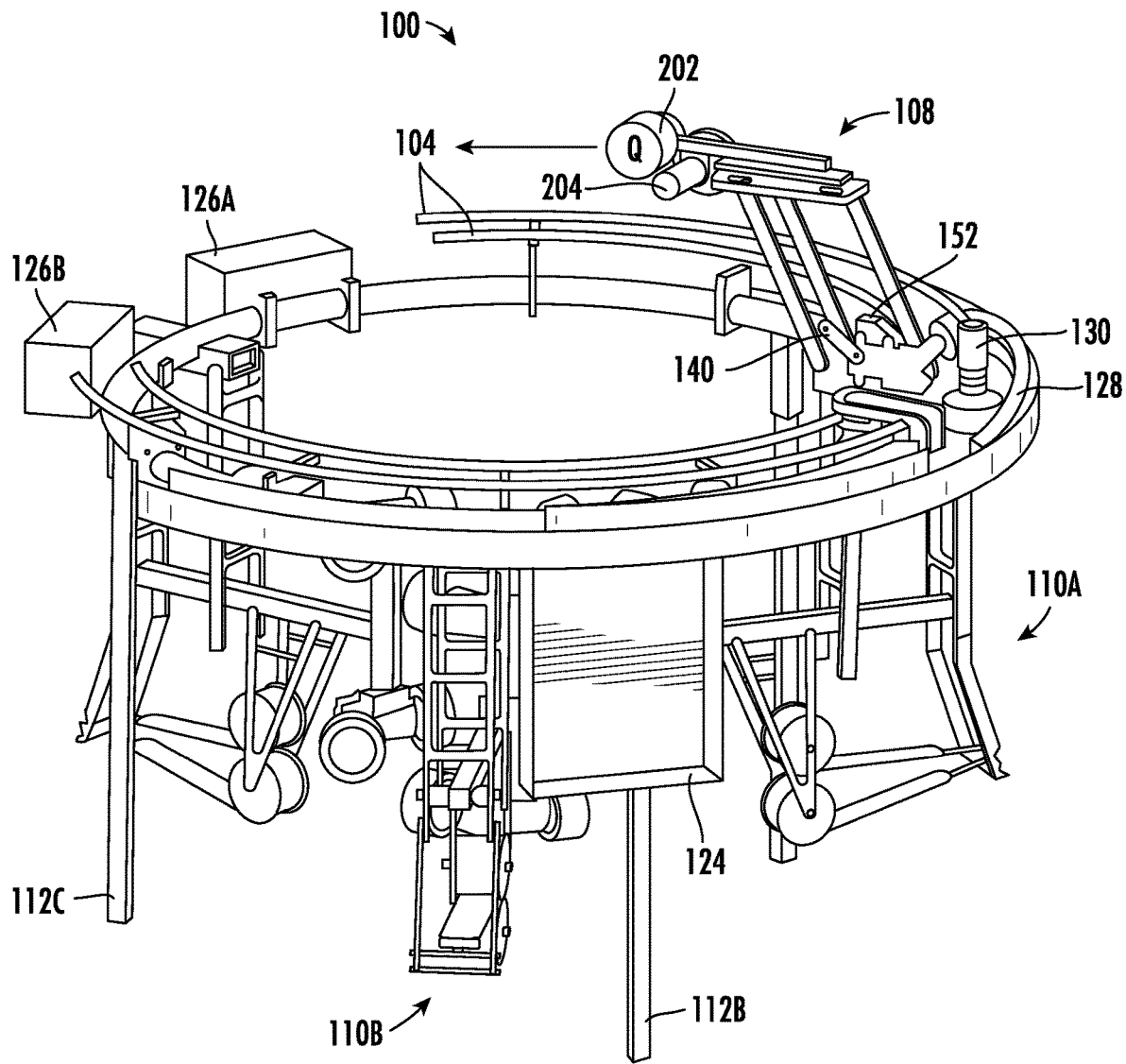
FIG. 6 is a perspective view of the robotic repair system with the attachment moved to a second position from that shown in FIG. 5 and making a repair.

Referring additionally to FIGS. 5 and 6, the paint roller 116 of the repair device 108 has been replaced by a grinder 202 mounted to the top bracket 146, where the grinder 202 is driven by a grinder motor 204. The grinder motor 204 is configured to rotate the grinder 202 to be able to remove rust, old paint, etc. from the high mast light pole before the coating (e.g., paint) is applied to make the repair. The repair device 108 moves forward and rearward as described above to apply pressure to the high mast light pole with the grinder 202.

Figure 7:
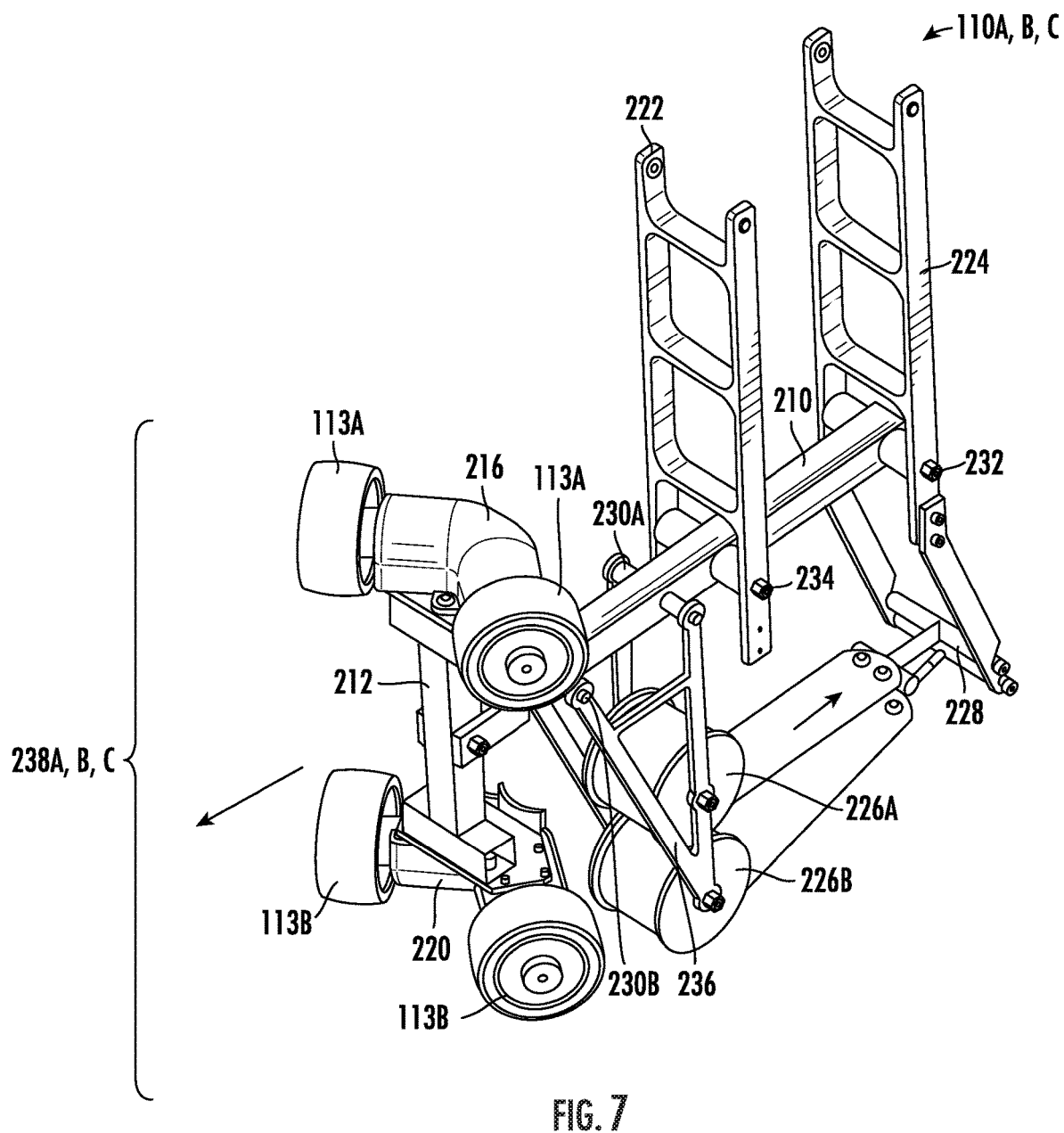
FIG. 7 is a perspective view of a drive assembly used to maneuver the robotic repair system along the high mast light pole.

Referring now to FIG. 7, a detail schematic of the drive assemblies 110A, 110B, 110C is shown. In a particular aspect, each of the drive assemblies 110A, 110B, 110C may include a center member 210 that has an outer vertical strut 224 coupled to an outer end of the center member 210 by outer pin 232. Also, an inner vertical strut 220 is coupled inward on the center member 210 by inner pin 234. At an inner end of the center member 210 is a vertical member 212 that may be orientated substantially perpendicular to the center member 210. The vertical member 210 has a first end and a second end that each have a pair of wheels 113A, 113B coupled thereto. An upper wheel motor 216 may be coupled to a first pair of wheels 113A and a lower wheel motor 220 may be coupled to a second pair of wheels 113B. The upper and lower wheel motors 216, 220 are configured to drive the pairs of wheels 113A, 113B in response to a control signal received from the command center 300 and are collectively referred to as the wheel assembly 238.

In order to maintain sufficient pressure of the robotic inspection device 100 to the high mast light pole, the spring mechanisms 226A, 226B each have a first end secured to a tension frame 236 that is suspended from the center member 210 between the wheel assembly 238 and the inner vertical strut 222. The tension frame 236 is suspended from the center member 210 using a pair of pivot pins 230A, 230B. A second end of each of the spring mechanisms 226A, 226B is secured to a lower end of the outer vertical strut 224. Accordingly, as the spring mechanisms 226A, 226B are tightened rearward, this causes the wheel assembly 238 to move in an opposite direction (forward) and reduce the diameter formed by the three drive assemblies 110A, 110B, 110C suspended from the support ring 102 by support brackets 111A, 111B, 111C, respectively, as best shown in FIG. 4. Each of the support brackets 111A, 111B, 111C are pivotally coupled to the support ring 102 by pairs of pins 240A, 240B, 240C.

As those of skill in the art can appreciate, the wheels 113A, 113B could comprise omnidirectional wheels with the ability to move sideways. Thus, the robot repair system 100 would not require the outer guide track 106, the pair of rails 104, or the drive wheel 114. Instead, in a particular aspect the repair device 108 would be fixed, and the robotic repair system 100 would be maneuvered around and along the high light pole to make the repairs.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A robotic repair system for high mast light poles comprising:
   a support ring having a diameter to fit around a high mast light pole;
   a guide system secured to and above the support ring;
   a repair device having an attachment to repair the high mast light pole, the repair device engaging the guide system; and
   a drive secured to the repair device and configured to move the repair device along the guide system;
   wherein the guide system comprises a pair of rails.

2. The robotic repair system of claim 1, wherein the drive comprises a drive wheel and a motor coupled to and configured to drive the drive wheel.

3. The robotic repair system of claim 2, further comprising an outer guide track secured adjacent to the guide system wherein the drive wheel is within the outer guide track.

4. The robotic repair system of claim 1, wherein the repair device comprises a platform coupled to an actuator configured to move the platform in a first direction, and an opposing second direction.

5. The robotic repair system of claim 4, wherein the repair device comprises an attachment having one of a paint roller and a grinder.

6. The robotic repair system of claim 5, wherein the platform is supported by a rear strut and a spaced apart front strut; the rear strut having a spring coupled to the actuator.

7. The robotic repair system of claim 1, further comprising a plurality of drive assemblies suspended from the support ring.

8. The robotic repair system of claim 7, wherein each of the drive assemblies comprise a plurality of wheels.

9. The robotic repair system of claim 8, wherein each of the plurality of drive assemblies comprises a spring mechanism configured to force the plurality of wheels inward of the support ring.

10. The robotic repair system of claim 1, further comprising a plurality of support legs secured to the support ring and configured to support the robotic repair system on a ground surface.

11. The robotic repair system of claim 7, further comprising a remote command center configured to transmit control signals to the plurality of drive assemblies.

12. The robotic repair system of claim 11, further comprising at least one video camera mounted to the repair device to transmit video to the command center.

13. The robotic repair system of claim 3, further comprising a continuous track within the outer guide track and between the drive wheel and the outer guide track.

14. The robotic repair system of claim 9, wherein the spring mechanism comprises a constant force spring.

15. A robotic repair system for high mast light poles comprising:
   a support ring having a diameter to fit around a high mast light pole;
   a guide system secured to and above the support ring and comprising a pair of rails;
   a repair device having an attachment to repair the high mast light pole, the repair device engaging the guide system;
   a drive secured to the repair device and configured to move the repair device along the guide system; and
   a plurality of drive assemblies suspended from the support ring.

16. The robotic repair system of claim 15, wherein the drive comprises a drive wheel and a motor coupled to and configured to drive the drive wheel.

17. The robotic repair system of claim 16, further comprising an outer guide track secured adjacent to the guide system wherein the drive wheel is within the outer guide track.

18. The robotic repair system of claim 15, wherein the repair device comprises a platform coupled to an actuator configured to move the platform in a first direction, and an opposing second direction.

19. A robotic repair system for high mast light poles comprising:
   a support ring having a diameter to fit around a high mast light pole;
   a guide system secured to and above the support ring and comprising a pair of rails;
   a repair device having an attachment to repair the high mast light pole, the repair device engaging the guide system; and
   a drive secured to the repair device and configured to move the repair device along the guide system;
   wherein the repair device comprises a platform coupled to an actuator configured to move the platform in a first direction, and an opposing second direction.

20. The robotic repair system of claim 19, wherein the platform is supported by a rear strut and a spaced apart front strut; the rear strut having a spring coupled to the actuator.

\* \* \* \* \*